US012645465B2

(12) United States Patent
Sung et al.

(10) Patent No.: US 12,645,465 B2
(45) Date of Patent: Jun. 2, 2026

(54) BOOT RAM FOR SAFETY CRITICAL DOMAIN

(71) Applicants: ATI TECHNOLOGIES ULC, Markham (CA); ADVANCED MICRO DEVICES, INC., Santa Clara, CA (US)

(72) Inventors: Andy Sung, Markham (CA); Carl Kittredge Wakeland, Santa Clara, CA (US); Gregory B. Shippen, Austin, TX (US); Kaushal Amolak Sanghai, Boxborough, MA (US); Uma Sankara Rao Balla, Hyderabad (IN); Balatripura S. Chavali, Austin, TX (US)

(73) Assignees: ATI TECHNOLOGIES ULC, Markham (CA); ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 18/375,294

(22) Filed: Sep. 29, 2023

(65) Prior Publication Data

US 2025/0110750 A1 Apr. 3, 2025

(51) Int. Cl.
G06F 9/00 (2018.01)
G06F 9/4401 (2018.01)
(52) U.S. Cl.
CPC .................................. G06F 9/4403 (2013.01)
(58) Field of Classification Search
CPC .................................. G06F 9/4403; G06F 9/00
See application file for complete search history.

(56) References Cited

U.S. PATENT DOCUMENTS

| | | | |
|---|---|---|---|
| 5,202,991 A | 4/1993 | Gamache | |
| 5,321,825 A | 6/1994 | Song | |
| 5,390,324 A | 2/1995 | Burckhartt et al. | |
| 5,611,042 A | 3/1997 | Lordi | |

(Continued)

FOREIGN PATENT DOCUMENTS

| | | |
|---|---|---|
| CN | 111683855 | 9/2020 |
| KR | 1020040010957 | 2/2004 |

(Continued)

OTHER PUBLICATIONS

Non-Final Office Action mailed Dec. 18, 2024 for U.S. Appl. No. 18/389,056, 21 pages.

(Continued)

*Primary Examiner* — Tammara R Peyton

(57) ABSTRACT

A processing system stores a boot image for a critical domain of a system-on-a-chip (SOC) at a bank of a static random-access memory (SRAM) that is shared by the critical domain and a non-critical domain and that is powered independently from the non-critical domain. The SOC includes a secure processor that loads the boot image to the bank of the SRAM and then blocks subsequent write access to the bank. Because the critical domain is powered independently from the non-critical domain, the bank of the SRAM retains the boot image without regard to the power state of the non-critical domain. In addition, the critical domain implements a boot process that is decoupled from a CPU at the non-critical domain, ensuring that the critical domain can initiate a re-boot sequence even if the non-critical domain is not powered.

20 Claims, 4 Drawing Sheets

(56) References Cited

U.S. PATENT DOCUMENTS

| | | | |
|---|---|---|---|
| 5,729,472 | A | 3/1998 | Seiffert et al. |
| 5,987,628 | A | 11/1999 | Von Bokern et al. |
| 6,370,656 | B1 | 4/2002 | Olarig et al. |
| 6,446,145 | B1 | 9/2002 | Har et al. |
| 6,584,587 | B1 | 6/2003 | McDermott |
| 6,640,268 | B1 | 10/2003 | Kumar |
| 7,426,644 | B1 | 9/2008 | Strongin et al. |
| 7,477,073 | B1 | 1/2009 | Tuan et al. |
| 8,824,692 | B2 | 9/2014 | Sheerin et al. |
| 9,122,476 | B2 | 9/2015 | Serebrin et al. |
| 9,411,688 | B1 * | 8/2016 | Poolla ............. H03K 19/17764 |
| 10,153,046 | B1 | 12/2018 | Agarwal et al. |
| 10,209,952 | B2 | 2/2019 | Tanaka et al. |
| 10,585,899 | B2 | 3/2020 | Usami et al. |
| 10,749,488 | B2 | 8/2020 | Quilter et al. |
| 11,496,577 | B2 * | 11/2022 | Acharya ................. H04L 45/74 |
| 11,558,706 | B2 | 1/2023 | Lesso |
| 2003/0115564 | A1 | 6/2003 | Chang et al. |
| 2008/0140957 | A1 | 6/2008 | Pattabiraman et al. |
| 2008/0147918 | A1 | 6/2008 | Hanebutte et al. |
| 2008/0195902 | A1 | 8/2008 | Astigarraga et al. |
| 2008/0320366 | A1 | 12/2008 | Lin |
| 2009/0282393 | A1 | 11/2009 | Costa et al. |
| 2010/0125427 | A1 | 5/2010 | Gaiser et al. |
| 2010/0125444 | A1 | 5/2010 | Arya et al. |
| 2012/0054543 | A1 | 3/2012 | Dreier |
| 2013/0254586 | A1 | 9/2013 | Winger et al. |
| 2014/0095947 | A1 | 4/2014 | Mozak et al. |
| 2015/0019154 | A1 | 1/2015 | Usami et al. |
| 2015/0055406 | A1 | 2/2015 | Andre |
| 2016/0364343 | A1 | 12/2016 | Case et al. |
| 2019/0278733 | A1 | 9/2019 | Kessler et al. |
| 2021/0182132 | A1 | 6/2021 | Chen et al. |
| 2022/0013127 | A1 | 1/2022 | Goldstein et al. |
| 2022/0121474 | A1 | 4/2022 | Brewer |
| 2023/0053582 | A1 | 2/2023 | Muralidharan et al. |
| 2023/0304266 | A1 | 9/2023 | Suzuki et al. |
| 2023/0350842 | A1 | 11/2023 | Ben-Amram et al. |
| 2023/0370184 | A1 | 11/2023 | Robertson et al. |
| 2024/0281325 | A1 | 8/2024 | Arbel et al. |
| 2024/0406693 | A1 | 12/2024 | Veloso et al. |
| 2025/0091436 | A1 | 3/2025 | Enapakurthi et al. |

FOREIGN PATENT DOCUMENTS

| | | |
|---|---|---|
| KR | 10-2019-00955338 | 5/2019 |
| WO | 2022252063 | 12/2022 |

OTHER PUBLICATIONS

International Search Report and Written Opinion issued in Application No. PCT/US/2024/034054, mailed Oct. 8, 2024, 10 pages.

U.S. Appl. No. 18/539,629, filed Dec. 14, 2023, listing Carl Kittredge Wakeland et al. as inventors, Entitled "Hardware Audio Modification System", 25 pages.

U.S. Appl. No. 18/617,112, filed Mar. 26, 2024, listing Uma Sankara Rao Balla et al. as inventors, Entitled "Shared Memory Freedom From Interference System", 49 pages.

U.S. Appl. No. 18/374,739, filed Sep. 29, 2023, listing Carl Kittredge Wakeland et al. as inventors, Entitled "Synchronized Audio Streaming From Multiple Controllers", 25 pages.

U.S. Appl. No. 18/389,056, filed Nov. 13, 2023, listing Uma Sankara Rao Balla et al. as inventors, Entitled "Error Detection for Sram Used in a Safety-Critical Domain", 49 pages.

U.S. Appl. No. 18/398,411, filed Dec. 28, 2023, listing Balatripura S. Chavali et al. as inventors, Entitled "Transactional Timeouts for Managing Critical Domains", 32 pages.

Non-Final Office Action mailed May 30, 2025 for U.S. Appl. No. 18/398,411, 11 pages.

Final Office Action mailed Mar. 28, 2025 for U.S. Appl. No. 18/389,056, 42 pages.

Non-Final Office Action mailed Sep. 30, 2025 for U.S. Appl. No. 18/617,112, 13 pages.

Final Office Action mailed Oct. 24, 2025 for U.S. Appl. No. 18/389,056, 22 pages.

Non-Final Office Action mailed Oct. 28, 2025 for U.S. Appl. No. 18/539,629, 13 pages.

Notice of Allowance mailed Oct. 21, 2025 for U.S. Appl. No. 18/374,739, 9 pages.

Non-Final Office Action mailed Oct. 2, 2025 for U.S. Appl. No. 18/398,411, 11 pages.

International Search Report and Written Opinion mailed Jun. 23, 2025 for PCT/US2025/019780, 10 pages.

Non-Final Office Action mailed Jul. 3, 2025 for U.S. Appl. No. 18/389,056, 20 pages.

* cited by examiner

300

400

DESIGNATE BANK OF SRAM AS CRITICAL DOMAIN — 402

LOAD BOOT IMAGE TO BANK OF SRAM — 404

CLEAR READ-ONLY BIT — 414

BLOCK SUBSEQUENT WRITE ACCESS TO THE BOOT IMAGE — 406

SCRUB BOOT IMAGE FOR ERRORS — 408

TIME FOR COLD REBOOT? — 410    NO

YES

SYSTEM IDLE? — 412    YES    NO

BOOT RAM FOR SAFETY CRITICAL DOMAIN

BACKGROUND

Initialization of a processing system including a system-on-a-chip (SOC) typically requires initializing a central processing unit (CPU), initializing a read-only memory (ROM) which is typically provided external to the CPU, includes security provisioning of the system, loading an operating system into the ROM from an external mass storage device, and executing user applications. The process of initializing the various hardware components of the processing system, such as the ROM, and the execution of the instructions contained in the ROM for initializing the higher system levels, which is also be referred to as boot-strapping or bootloading, depends on initialization of the CPU and requires that the ROM be included in the SOC.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
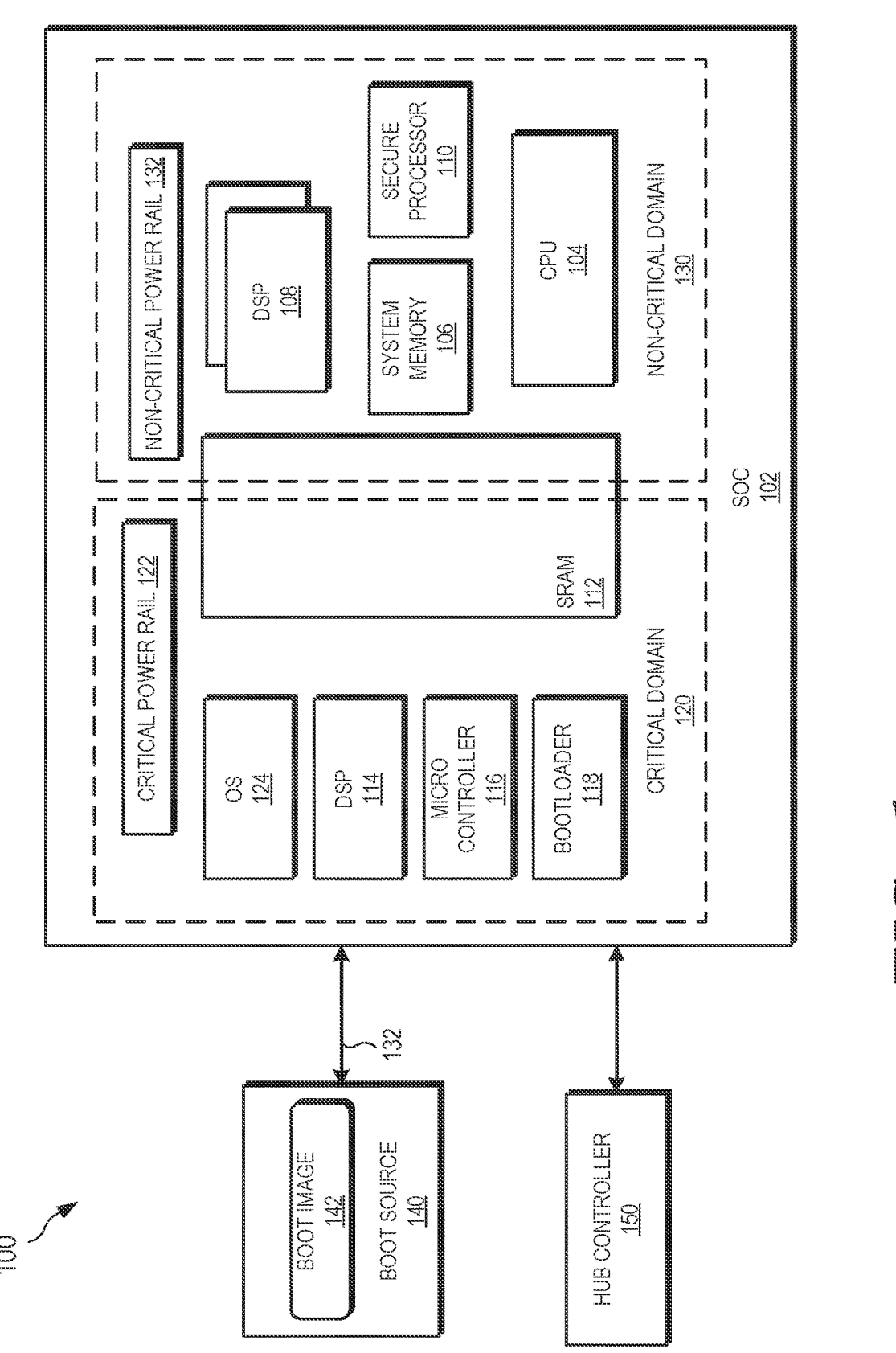
FIG. 1 is a block diagram of a processing system having a non-critical domain and an independently powered critical domain including a static random-access memory (SRAM) to store a boot image in accordance with some embodiments.

Some processing systems, such as audio co-processors implemented in vehicles, are partitioned into a critical domain and a non-critical domain. The critical domain includes a set of controllers responsible for critical audio functions such as generating chimes and alerts and handling emergency calls. The non-critical domain includes a CPU, interconnects, and external input/output (IO) devices such as memory. In some circumstances, such as an impact from a motor vehicle accident, power supplied to the non-critical domain could be disrupted. In some embodiments, the critical and non-critical domains are partitioned regions of the processing system based on market, application, or use case. To maintain operability of the critical domain even when the non-critical domain is powered down, the critical domain must be able to reboot independently from the CPU. By independently rebooting the critical domain, the processing system ensures that critical functions such as chimes, alerts, and emergency calls are enabled in the absence of power to the non-critical domain.

FIGS. 1-4 illustrate techniques for storing a boot image (including, in some embodiments, boot code) for the critical domain of a system-on-a-chip (SOC) at a bank of a static random-access memory (SRAM, also referred to herein as a RAM) that is shared by the critical domain and the non-critical domain and that is powered independently from the non-critical domain, including from a CPU of the SOC. In some implementations, the boot image is an operating system or a hypervisor that controls the SOC for a majority of time that the SOC is running. For example, in some implementations, the boot image includes the operating system, utilities and diagnostics, and boot and recovery information. SRAM allows fast access times and low power consumption, and is powered by a backup power supply similar to the critical domain. The SOC includes a secure processor that loads the boot image to the bank of the SRAM and then blocks subsequent write access to the bank. Because the critical domain is powered independently from the non-critical domain, the bank of the SRAM retains the boot image without regard to the power state of the non-critical domain. In addition, the critical domain implements a boot process that is decoupled from the CPU at the non-critical domain, ensuring that the critical domain can initiate a re-boot sequence even if the non-critical domain is not powered.

In some embodiments, the secure processor validates the boot image prior to loading the boot image to the bank of the SRAM and then blocks subsequent write access to the bank of the SRAM by setting a read-only bit or a write-once bit for the bank. The read-only bit or the write-once bit "locks" the boot image within the SRAM such that the boot image does not require further validation after it has been loaded to the SRAM. To maintain the integrity of the of the boot image, in some embodiments, the critical domain includes hardware circuitry such as a microcontroller that "scrubs" the bank of the SRAM to detect and correct errors in the boot image. For example, as the individual memory cell structures of SRAM have become smaller, they have become vulnerable to cosmic rays and alpha particle emission that can cause soft errors that are more likely to occur with extended uptime. Accordingly, in some embodiments, the microcontroller employs error correction code (ECC) to detect and correct single-bit errors in the boot image. Scrubbing refers to performing a read of bits, checking the validity of the code, performing a correction if needed, and writing the bits back if a correction is performed. The setting of the read-only or write-once bit allows the correction of single-bit errors through ECC but otherwise blocks write access to the bank of the SRAM and, by extension, to the boot image stored at the bank of the SRAM.

To further correct any accumulated errors in the boot image that are not correctable by the ECC, the processing system periodically forces a re-initialization (e.g., a cold reboot) of the safety-critical domain. In some embodiments, the microcontroller clears the read-only or write-once bit and causes the secure processor to re-load the boot image to the bank of the SRAM. In some embodiments, a hub controller initiates the cold reboot when a predetermined amount of time (e.g., 24 hours) has passed since a previous initialization and when the SOC is idle. In some embodiments, the microcontroller forces a re-initialization of the safety-critical domain in response to detecting an error that the ECC cannot correct.

FIG. 1 illustrates a processing system 100 having a non-critical domain 130 and an independently-powered critical domain 120 of a system-on-a-chip (SOC) 102 including a static random access memory (SRAM) 112 to store boot code in accordance with some embodiments. In the illustrated example, the non-critical domain 130 includes a central processing unit (CPU) 104, system memory 106, one or more digital signal processors (DSPs) 108, and a secure processor 110. The components of the non-critical domain 130 are powered by a non-critical domain power rail 132. The critical domain 120 includes hardware circuitry such as a microcontroller 116 and one or more DSPs 114. The SOC 102 further includes a SRAM 112 that is shared between the critical domain 120 and the non-critical domain 130. The components of the critical domain 120 and the SRAM 112 are powered by a critical domain power rail 122 that is independent of the non-critical domain power rail 132.

The processing system 100 is generally configured to execute sets of instructions (e.g., computer programs) to carry out specified tasks for an electronic device. Examples of such tasks include controlling aspects of the operation of the electronic device, displaying information to a user to provide a specified user experience, communicating with other electronic devices, and the like. Accordingly, in different embodiments the processing system 100 is employed in one of a number of types of electronic device, such as a desktop computer, laptop computer, server, game console, tablet, smartphone, and the like. In some embodiments, the SOC 102 is an audio co-processor for applications in an automobile.

The non-critical domain 130 generally performs functions that require transactions with the CPU 104 or the system memory 106, such as internet audio, Bluetooth and WiFi, a radio tuner, non-critical telephony, and miscellaneous audio processing. The critical domain 120 is capable of functioning independently of the CPU 104 and the system memory 106, and generally performs critical functions such as a tamper or intrusion alarm; chimes and alerts related to driving, turn signals, and open doors; pedestrian warning sounds; emergency alerts; remote honking, locking, and unlocking; emergency calls; and glass break sensing and alarms.

In some embodiments, the CPU 104 includes one or more instruction pipelines to fetch instructions, decode the instructions into corresponding operations, dispatch the operations to one or more execution units, execute the operations, and retire the operations. In the course of executing instructions, the CPU 104 generates audio operations and other operations associated with the audio display of information. Based on these operations, the CPU 104 provides commands and data to the one or more DSPs 108.

The DSPs 108 are generally configured to receive the commands and data associated with audio processing operations from the CPU 104 or a host operating system (OS) (not shown). The DSPs 108 are processors that carry out digital signal processing algorithms (e.g., for audio processing). Examples of such algorithms include finite impulse response (FIR) filtering algorithms, and so forth. Typically, a DSP 108 will perform such algorithms more efficiently (e.g., faster, and/or using less power) than a CPU or other processor in a computing system. Accordingly, in some implementations, the CPU 104 or host OS transfers data to the DSPs 108 to perform such calculations, and retrieves or receives the results after the DSPs 108 have completed the calculations.

The CPU 104 and DSPs 108 are coupled to the system memory 106. The CPU 104 and DSPs 108 execute instructions stored in the form of one or more software programs and store information in the system memory 106 such as the results of the executed instructions. In various embodiments, the system memory 106 stores processing logic instructions, constant values, variable values during execution of portions of applications or other processing logic, or other desired information. During execution, applications, operating system functions, processing logic commands, and system software reside in system memory 106. Control logic commands that are fundamental to the operating system (not shown) generally reside in system memory 106 during execution. In some embodiments, other software commands (e.g., a device driver) also reside in system memory 106 during execution of the CPU 104. For example, system memory 106 stores a plurality of previously-generated audio data (not shown) that it receives from the DSPs 108. In some embodiments, system memory 106 is implemented as a dynamic random access memory (DRAM), and in some embodiments, system memory 106 is implemented using other types of memory including static random access memory (SRAM), non-volatile RAM, and the like. Some embodiments of the processing system 100 include an input/output (I/O) engine (not shown) for handling input or output operations associated with an audio system (not shown), as well as other elements of the processing system 100 such as microphones, speakers, tuners, controllers, and the like.

The secure processor 110 transfers instructions and data to and from the SRAM 112 under protection of a secure hash. For example, in some embodiments, a hash is calculated for a given firmware image or code and the secure processor 110 validates the calculated hash against a reference hash to authenticate the firmware image or code. In addition, the secure processor 110 is configured to enable (i.e., set) the division between the critical domain 120 and the non-critical domain 130 in some embodiments. In some embodiments, the division between the critical domain 120 and the non-critical domain 130 is cleared by performing a cold reset.

The critical domain 120 includes a bootloader 118, the microcontroller 116 and one or more DSPs 114 to carry out digital signal processing algorithms for critical audio functions such as chimes, alerts, and emergency calls. Similar to the CPU 104, the microcontroller 116 includes one or more instruction pipelines to fetch instructions, decode the instructions into corresponding operations, dispatch the operations to one or more execution units, execute the operations, and retire the operations. The microcontroller 116 generates audio operations and other operations associated with the critical audio functions. Based on these operations, the microcontroller 116 provides commands and data to the one or more DSPs 114.

The critical domain 120 components are required to continue functioning in the event of a partial or complete failure or crash of the CPU 104 and/or system memory 106. In addition, because the critical domain 120 is powered by the critical domain power rail 122, components of the critical domain 120 continue to function in the event of a loss of power at the non-critical domain rail 132.

The SRAM 112 includes a plurality of, e.g., 128 kB banks (not shown) and is shared between the critical domain 120 and the non-critical domain 130. One or more banks of the plurality of banks are designated by the secure processor 110 as belonging to the critical domain 120, while other banks are designated as belonging to the non-critical domain 130 or as shared between the two domains. For example, audio data streams and messages are communicated between the critical domain 120 and the non-critical domain 130 via one or more shared banks of the SRAM 112.

To enable the microcontroller 116 of the critical domain 120 to boot independently from the CPU 104 and other components of the non-critical domain 130, a boot image 142 for the critical domain 120 is stored within the SOC 102 where the boot image 142 can be retained independent of the power state of the non-critical domain 130. To facilitate a boot process for the microcontroller 116 that does not depend on the non-critical domain 130, the SOC 102 designates a bank of the SRAM 112 to store the boot image 142 received from an external boot source 140 in accordance with some embodiments. In some embodiments, the external boot source 140 is a read-only memory (ROM) or other off-SOC storage device such as a flash drive or non-volatile memory.

In some embodiments, the processing system 100 includes a hardware circuitry controller referred to as a hub controller 150 that is external to the SOC 102 and that triggers a cold boot process in which the secure processor 110 loads the boot image 142 from the boot source 140 into the SOC 102 and validates the boot image 142 by, for example, verifying a cryptographic signature, comparing a hash function, or employing a secure boot mechanism. Once the boot image 142 has been validated, the secure processor 110 transfers the boot image 142 to the designated bank of the SRAM 112 in the critical domain 120. The secure processor 110 then locks the boot image 142 at the designated bank to prevent subsequent write access to the boot image 142. For example, in some embodiments, the secure processor 110 sets a read-only or a write-once bit for the boot image 142.

During a cold boot process, the bootloader 118 performs core initialization of the hardware of the microcontroller 116 and loads the operating system (OS) 124. The bootloader 118 then hands control to the OS 124, which initializes itself and configures the critical domain 120 hardware by, for example, setting up memory management, setting timers and interrupts, and loading device drivers. In some embodiments the bootloader 118 includes a Basic Input/Output System (BIOS) (not shown) and a hardware configuration (not shown) indicating the hardware configuration of the microcontroller 116 and is connected to the designated bank of the SRAM 112. In some embodiments, the designated bank of the SRAM 112 stores the boot image 142 for execution during a boot process that is initiated upon a power-on reset. Booting refers to any of a variety of initialization specifications or processes, BIOS, extensible firmware interface (EFI), unified EFI (UEFI), and the like.

Figure 2:
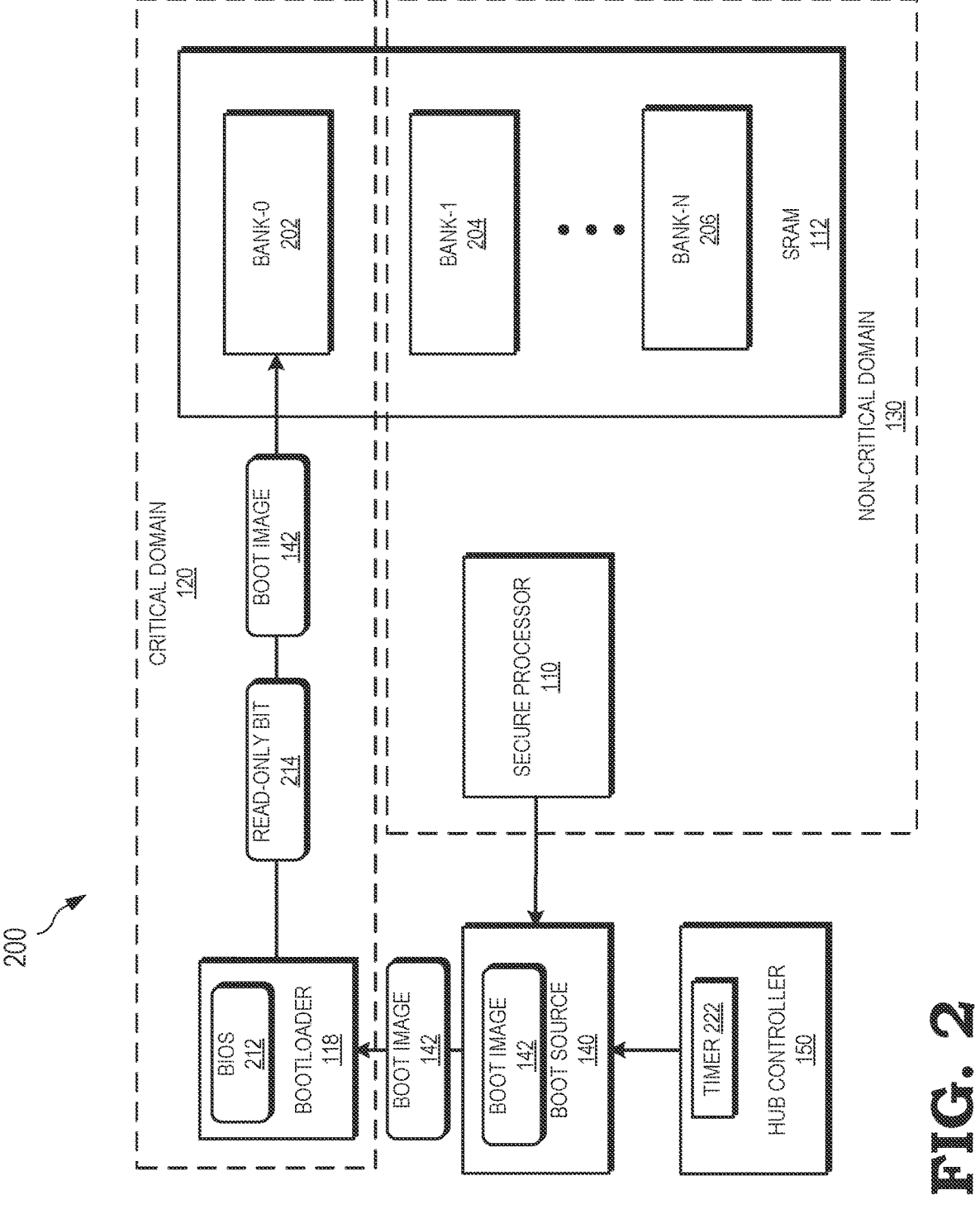
FIG. 2 is a block diagram illustrating loading and locking a boot image for a critical domain of a SOC at a bank of an SRAM in accordance with some embodiments.

FIG. 2 is a block diagram of a portion 200 of the processing system 100 illustrating loading and locking the boot image 142 for the critical domain 120 of the SOC 102 at a bank of the SRAM 112 in accordance with some embodiments. The SRAM 112 includes a plurality of banks such as bank-0 202, bank-1 204, . . . , bank-N 206. Each bank is designated by a DSP or the by the secure processor 110 as belonging to one of the critical domain 120 and the non-critical domain 130, or as shared between the critical domain 120 and the non-critical domain 130. In the illustrated example, bank-0 202 is designated as belonging to the critical domain 120, and bank-1 204 through bank-N 206 are designated as belonging to the non-critical domain 130.

In some embodiments, the hub controller 150 initiates an initial cold boot process by signaling the secure processor 110 to validate the boot image 142. In some embodiments, the secure processor 110 validates the boot image 142 by verifying a cryptographic signature using a corresponding public key to determine if the signature matches. In other embodiments, the secure processor 110 validates the boot image 142 by applying a hash function to the boot code and comparing the hash value to a known, trusted hash value. In some embodiments, the secure processor 110 employs a secure boot mechanism using a root of trust holding cryptographic keys or certificates to verify signatures or hashes of the boot image 142 or corresponding boot code to verify the integrity of the boot image 142.

The external boot source 140 transfers the boot image 142 to bank-0 202 via a bus interface (not shown). In some embodiments, the secure processor 110 validates the boot image 142 to verify data integrity by, for example, performing a checksum. If the checksum validates the integrity of the boot image 142, the secure processor 110 releases the boot image 142 by allowing the DSPs 114 to access the boot image 142 and program the boot image 142 onto bank-0 202 of the SRAM 112.

The bootloader 118 transfers the boot image 142 to bank-0 202 of thte SRAM 112 and further sets a read-only bit 214 for the boot image 142. In some embodiments, the bootloader 118 sets a write-once bit (not shown). The read-only bit 214 (or write-once bit) ensures that the boot image 142 cannot be changed other than through ECC error correction once the boot image 142 is stored at the designated critical domain bank of the SRAM 112.

In some embodiments, the bootloader 118 includes a BIOS 212 to assist in the boot process. After the boot image 142 has been validated by the secure processor 110, the BIOS 212 uses information obtained during firmware initialization to create or update tables of the hardware configuration with various platform and device configurations including power interface data. The bootloader 118 includes executable code that loads the OS 124 into bank-0 202 of the SRAM 112 and starts the OS 124. At this point, the BIOS 212 stops controlling the critical domain 120. The bootloader 118 loads and executes the various components of the OS 124 into bank-0 202 and communicates the hardware configuration to the OS 124. The bootloader 118 also accesses software and firmware necessary for the next stage of the bootstrapping process from bank-0 202. During its initialization, the OS 124 starts and initializes a kernel (not shown) to allow the kernel to provide tasks in the form of processor instructions to the DSPs 114. The kernel manages execution of processes on the DSPs 114.

In some embodiments, the hub controller 150 includes a timer 222 configured to track how much time has elapsed since the previous cold reboot of the critical domain 120. In some embodiments, the timer 222 is programmable to compare the elapsed time since the previous cold reboot to a programmable threshold (not shown). If the elapsed time since the previous cold reboot exceeds the programmable threshold, the hub controller 150 determines whether the SOC 102 is in an idle state (e.g., if the automobile in which the SOC 102 is implemented is powered down). If the SOC 102 is in an idle state and the elapsed time exceeds the programmable threshold (e.g., 24 hours), the hub controller 150 forces a re-initialization (cold reboot) of the critical domain 120. By periodically re-initializing the critical domain 120, the hub controller 150 prevents errors in the boot image 142 from accumulating.

Figure 3:
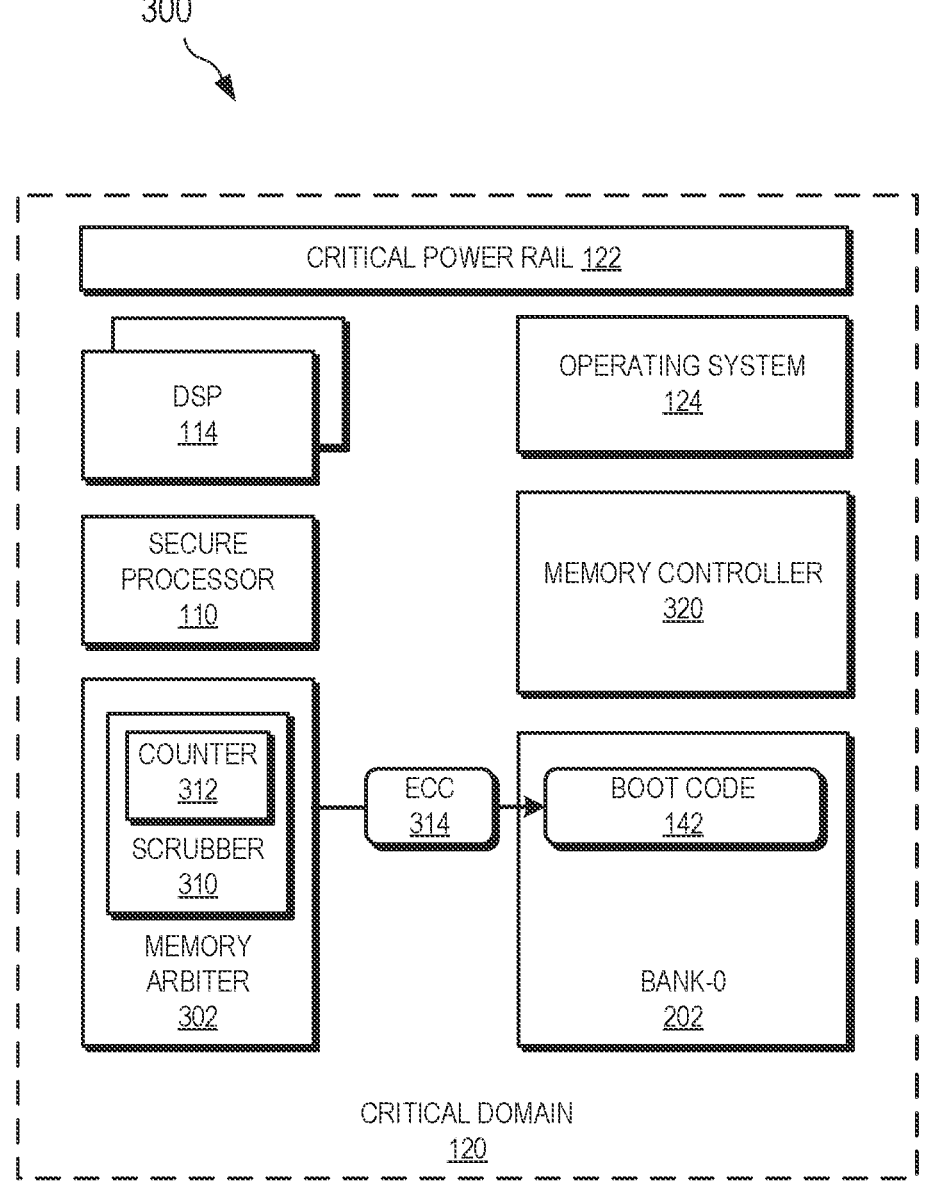
FIG. 3 is a block diagram illustrating periodic scrubbing of a boot image at a critical domain of a SOC at a bank of an SRAM in accordance with some embodiments.

FIG. 3 is a block diagram of a portion 300 of the processing system 100 illustrating periodic scrubbing of the boot image 142 at the critical domain 120 of the SOC 102 at a bank of the SRAM 112 in accordance with some embodiments. In the illustrated embodiment, the critical domain 120 includes a memory arbiter 302 and a memory controller 320. Each of the DSPs 114 includes one or more caches (not shown) configured to store subsets of data and/or instructions stored at the SRAM 112. If requested data is not resident in a cache of a DSP 114, a memory access request is forwarded to the memory controller 320. The memory controller 320 provides an interface for the DSPs 114 to access the SRAM 112, including bank-0 202 of the SRAM 112. The memory arbiter 302 performs arbitration between DSPs 114 to order accesses among the different DSPs 114 to the SRAM 112.

In some embodiments, the memory arbiter 302 includes a scrubber 310 that traverses the boot image 142 in bank-0 202 and corrects any correctable errors. The scrubber 310 implements ECC 314 to correct single-bit errors in some embodiments. During this process, the ECC 314 checks the data and tags of the boot image 142 and corrects single-bit errors by writing corrected data and tags into the bank-0 202. In some embodiments, the scrubber 310 includes a timer 312 that triggers periodic scrubbing of the boot image 142. When the scrubber 310 detects that an uncorrectable fault has occurred, or that a rate or number of correctable faults has exceeded a threshold, the scrubber 310 issues a memory error indication to notify the OS 124, and/or the memory controller 320. In response to the indication, the hub controller 150 initiates a system reset or SOC reset when the SOC 102 is idle.

Detection of uncorrectable errors is also triggered by memory accesses initiated by the DSPs 114 independently from the operations of the scrubber 310. If one of the DSPs 114 attempts to access a portion of the boot image 142 data stored at bank-0 202 that has an uncorrectable error, the memory controller 320 issues a memory error indication to notify the OS 124. In response to the indication, the hub controller 150 initiates a cold reboot at a time when the SOC 102 is idle.

Figure 4:
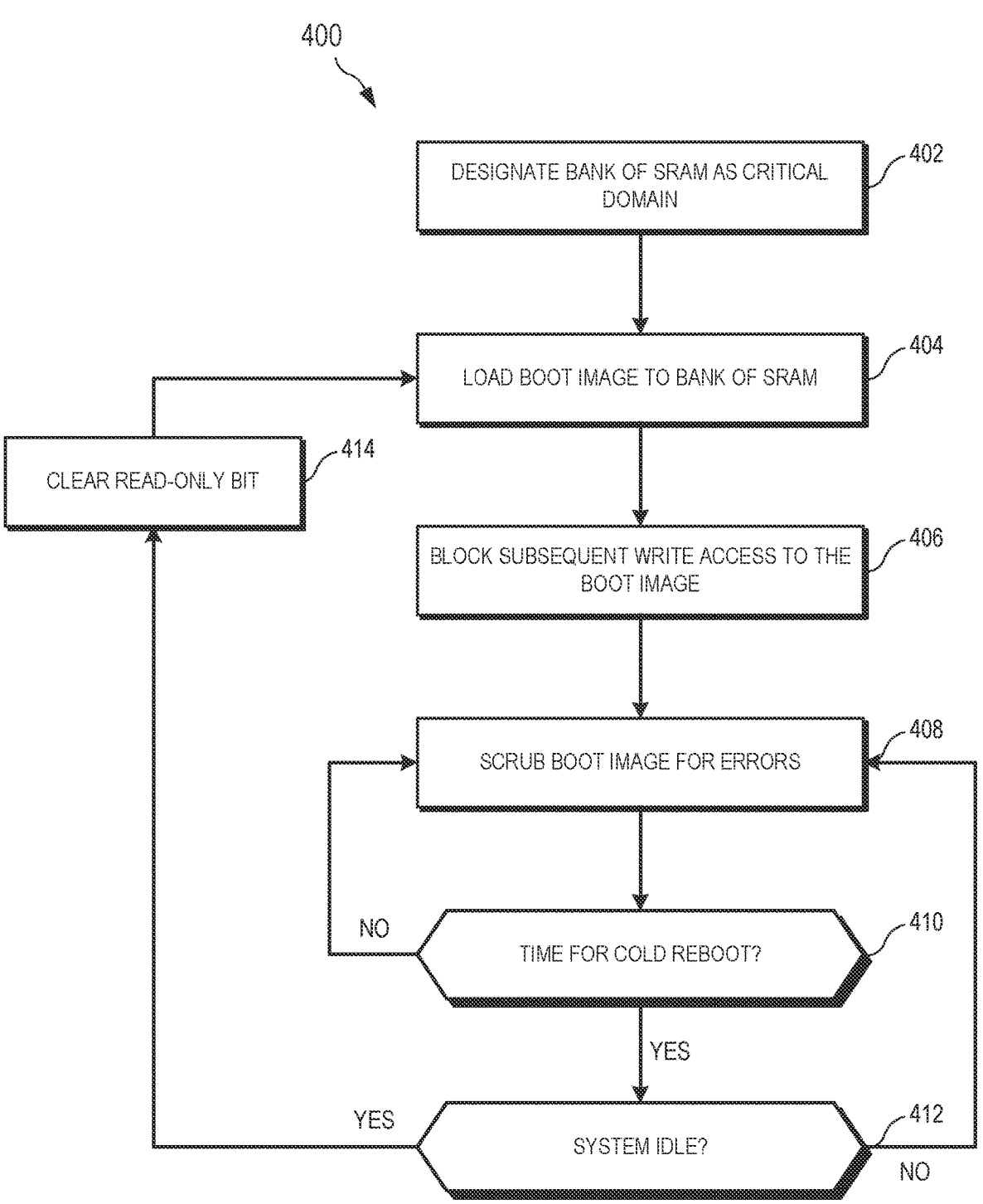
FIG. 4 is a flow diagram illustrating a method for loading, locking, and scrubbing a boot image for a critical domain of a SOC at a bank of an SRAM in accordance with some embodiments.

FIG. 4 is a flow diagram illustrating a method 400 for loading, locking, and scrubbing boot code for a critical domain of a SOC at a bank of a RAM in accordance with some embodiments. In some embodiments, the method 400 is implemented in a processing system such as processing system 100.

At block 402, one of the DSPs 108, 114 or the secure processor 110 assigns one or more banks of the SRAM 112 to the critical domain 120 of the SOC 102. In some embodiments, the assignment of resources to the critical domain 120 is configured at cold boot, after which the assignment is locked and protected from modification. As part of the critical domain 120, the bank of the SRAM 112 functions independently of the CPU 104 and system memory 106 and retains the boot image 142 even when the non-critical domain 130 is powered off. Thus, the critical domain 120 can boot autonomously, providing continuous operation of mission-critical functions.

At block 404, the hub controller 150 triggers a cold reboot of the critical domain 120, in response to which the secure processor 110 initiates loading the boot image 142 from an external boot source 140 to the designated bank of the SRAM 112 (e.g., bank-0 202). In some embodiments, the secure processor 110 validates the boot image 142 prior to transferring the boot image 142 to bank-0 202 of the SRAM.

At block 406, the secure processor 110 blocks further write access to the boot image 142. For example, in some embodiments the secure processor 110 sets a read-only bit or a write-once bit for the boot image 142. The read-only bit or the write-once bit blocks subsequent write access to the boot image 142 except for limited error corrections (e.g., single-bit corrections implemented by ECC 314). Because the boot image 142 is locked within the SRAM 112 after validation, there is no need to re-validate the boot image 142 after the initial cold boot.

At block 408, the scrubber 310 periodically checks the boot image 142 for errors. In some embodiments, the scrubber 310 uses ECC 314 to detect and correct correctable (e.g., single-bit) errors. The scrubber 310 periodically checks for errors based on a timer 312 in some embodiments, and in other embodiments, the scrubber 310 opportunistically checks for errors in the course of memory accesses allowed by the memory arbiter 302 to the boot image 142.

To prevent errors from accumulating and to correct errors that are not correctable by the ECC 314, the hub controller 150 periodically forces a self-reboot process. To that end, the hub controller 150 implements the timer 222 to track the passage of time since a previous cold reboot. At block 410, the hub controller 150 determines if a threshold amount of time (e.g., 24 hours) has passed since the previous cold reboot.

If, at block 410, a threshold amount of time has not elapsed since the previous cold reboot, the method flow continues back to block 408. If, at block 410, a threshold amount of time has elapsed since the previous cold reboot, the method flow continues to block 412. At block 412, the hub controller 150 determines if the SOC 102 is idle. Performing a cold reboot of the critical domain during operation of the SOC 102 would potentially be unsafe in embodiments in which the processing system is implemented in a motor vehicle. Thus, in some embodiments, a cold reboot can only be performed when the SOC 102 is idle. If the SOC 102 is not idle, the method flow continues back to block 408. If the SOC 102 is idle, the method flow continues to block 414.

At block 414, the secure processor 110 clears the read-only bit to allow subsequent write access to the boot image 142. The method flow then continues to block 404 to re-load the boot image 142 to the bank of the SRAM 112.

In some embodiments, the apparatus and techniques described above are implemented in a system including one or more integrated circuit (IC) devices (also referred to as integrated circuit packages or microchips), such as the processing system described above with reference to FIGS. 1-4. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

One or more of the elements described above is circuitry designed and configured to perform the corresponding operations described above. Such circuitry, in at least some embodiments, is any one of, or a combination of, a hard-coded circuit (e.g., a corresponding portion of an application specific integrated circuit (ASIC) or a set of logic gates, storage elements, and other components selected and arranged to execute the ascribed operations), a programmable circuit (e.g., a corresponding portion of a field programmable gate array (FPGA) or programmable logic device (PLD)), or one or more processors executing software instructions that cause the one or more processors to implement the ascribed actions. In some embodiments, the circuitry for a particular element is selected, arranged, and configured by one or more computer-implemented design tools. For example, in some embodiments the sequence of operations for a particular element is defined in a specified computer language, such as a register transfer language, and a computer-implemented design tool selects, configures, and arranges the circuitry based on the defined sequence of operations.

Within this disclosure, in some cases, different entities (which are variously referred to as "components," "units," "devices," "circuitry", etc.) are described or claimed as "configured" to perform one or more tasks or operations. This formulation—[entity] configured to [perform one or more tasks]—is used herein to refer to structure (i.e., something physical, such as electronic circuitry). More specifically, this formulation is used to indicate that this physical structure is arranged to perform the one or more tasks during operation. A structure can be said to be "configured to" perform some task even if the structure is not currently being operated. A "memory device configured to store data" is intended to cover, for example, an integrated circuit that has circuitry that stores data during operation, even if the integrated circuit in question is not currently being used (e.g., a power supply is not connected to it). Thus, an entity described or recited as "configured to" perform some task refers to something physical, such as a device, circuitry, memory storing program instructions executable to implement the task, etc. This phrase is not used herein to refer to something intangible. Further, the term "configured to" is not intended to mean "configurable to." An unprogrammed field programmable gate array, for example, would not be considered to be "configured to" perform some specific function, although it could be "configurable to" perform that function after programming. Additionally, reciting in the appended claims that a structure is "configured to" perform one or more tasks is expressly intended not to be interpreted as having means-plus-function elements.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disk, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   storing a boot image for a critical domain of a system on a chip (SOC) comprising the critical domain and a non-critical domain at a bank of a static random access memory (SRAM), wherein the SRAM is shared by the critical domain and the non-critical domain; and
   blocking write access to the bank subsequent to the storing.

2. The method of claim 1, wherein blocking write access comprises setting a read-only or a write-once bit for the bank.

3. The method of claim 1, further comprising:
   scrubbing the bank to detect and correct errors in the boot image.

4. The method of claim 1, further comprising:
   retaining the boot image at the bank of the SRAM when the non-critical domain is powered off.

5. The method of claim 1, further comprising:
   periodically performing a cold reboot of the critical domain.

6. The method of claim 5, wherein periodically performing comprises performing the cold reboot when a predetermined amount of time has elapsed since a previous cold reboot and when the SOC is idle.

7. The method of claim 1, further comprising:

validating the boot image prior to storing the boot image at the bank.

8. A device comprising:

a system on a chip (SOC) comprising a critical domain and a non-critical domain, comprising:

a static random access memory (SRAM) comprising a plurality of banks; and a secure processor configured to:

store a boot image for the critical domain at a bank of the plurality of banks; and block write access to the bank subsequent to the storing.

9. The device of claim 8, wherein the secure processor is configured to block write access by setting a read-only or a write-once bit for the bank.

10. The device of claim 8, further comprising:

a microcontroller configured to scrub the bank to detect and correct errors in the boot image.

11. The device of claim 10, wherein the microcontroller is further configured to:

scrub the bank by performing error correction code checking of the bank.

12. The device of claim 10, wherein the microcontroller is further configured to:

periodically perform a cold reboot of the critical domain.

13. The device of claim 12, wherein the microcontroller is further configured to:

perform the cold reboot when a predetermined amount of time has elapsed since a previous cold reboot and when the SOC is idle.

14. The device of claim 8, wherein the secure processor is further configured to: validate the boot image prior to storing the boot image at the bank.

15. A system comprising:

a static random access memory (SRAM);

a non-critical domain comprising a central processing unit;

a critical domain powered independently from the non-critical domain; and a secure processor configured to:

store a boot image for the critical domain at a bank of the SRAM; and block write access to the bank subsequent to the storing.

16. The system of claim 15, wherein the secure processor is further configured to validate the boot image prior to storing the boot image at the bank.

17. The system of claim 15, wherein the secure processor is further configured to block write access by setting a read-only or a write-once bit for the bank.

18. The system of claim 15, further comprising:

hardware circuitry configured to scrub the bank to detect and correct errors in the boot image.

19. The system of claim 18, wherein the hardware circuitry is further configured to: periodically perform a cold reboot of the critical domain.

20. The system of claim 19, wherein the hardware circuitry is further configured to: perform the cold reboot when a predetermined amount of time has elapsed since a previous cold reboot and when the system is idle.

\* \* \* \* \*